United States Patent
Sherlock

(10) Patent No.: US 12,457,170 B2
(45) Date of Patent: Oct. 28, 2025

(54) MULTIPATH ROUTING FOR SWITCHING FABRIC

(71) Applicant: Hewlett Packard Enterprise Development LP, Spring, TX (US)

(72) Inventor: Derek Alan Sherlock, Fort Collins, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 37 days.

(21) Appl. No.: 18/412,088

(22) Filed: Jan. 12, 2024

(65) Prior Publication Data
US 2025/0119378 A1    Apr. 10, 2025

Related U.S. Application Data

(60) Provisional application No. 63/589,116, filed on Oct. 10, 2023.

(51) Int. Cl.
| | |
|---|---|
| *H04L 45/00* | (2022.01) |
| *H04L 45/12* | (2022.01) |
| *H04L 45/121* | (2022.01) |
| *H04L 45/24* | (2022.01) |

(52) U.S. Cl.
CPC ............ *H04L 45/38* (2013.01); *H04L 45/121* (2013.01); *H04L 45/123* (2013.01); *H04L 45/24* (2013.01)

(58) Field of Classification Search
CPC ..... H04L 45/121; H04L 45/123; H04L 45/24; H04L 45/38
See application file for complete search history.

(56) References Cited

U.S. PATENT DOCUMENTS

| | | | | |
|---|---|---|---|---|
| 9,137,143 | B2* | 9/2015 | Parker | H04Q 11/0005 |
| 9,614,786 | B2* | 4/2017 | Kim | G06F 13/4221 |
| 10,476,780 | B2* | 11/2019 | McDonald | H04L 45/122 |
| 10,887,217 | B2* | 1/2021 | McDonald | H04L 45/125 |
| 11,165,686 | B2* | 11/2021 | Heidelberger | H04L 49/101 |
| 12,028,263 | B2* | 7/2024 | Muntz | H04L 47/39 |
| 2018/0006946 | A1* | 1/2018 | Flajslik | H04L 47/12 |
| 2023/0014645 | A1* | 1/2023 | Muntz | H04L 49/30 |

OTHER PUBLICATIONS

Yue Wu et al. "A survey of routing algorithm for mesh Network-on-Chip", Frontiers of Computer Science, vol. 10, pp. 591-601, published Apr. 18, 2016. (Year: 2016).*

* cited by examiner

*Primary Examiner* — G. C. Neurauter, Jr.
(74) *Attorney, Agent, or Firm* — Slater Matsil, LLP

(57) ABSTRACT

A switching fabric uses traffic congestion information to inform its opportunistic use of non-minimal routes. An ingress port of a network switch collects traffic congestion information from the egress ports of the network switch. The traffic congestion information includes minimal and non-minimal route congestion metrics for the egress ports. Candidate egress ports for forwarding a packet to a destination node are identified. One of the candidate egress ports is selected based on the traffic congestion information. The selection process is biased to prefer some candidate egress ports over others. Particularly, the candidate egress ports that provide non-minimal routes to the destination node and have high minimal route congestion metrics are disfavored by the selection process.

20 Claims, 6 Drawing Sheets

MULTIPATH ROUTING FOR SWITCHING FABRIC

CROSS-REFERENCE TO RELATED APPLICATIONS

This application claims the benefit of U.S. Provisional Application No. 63/589,116, filed on Oct. 10, 2023, which application is hereby incorporated herein by reference.

BACKGROUND

Network switching is a fundamental concept in computer networking that involves the forwarding of data packets between nodes within a network. A network switch analyzes an incoming packet's destination and uses this information to make forwarding decisions, thus performing data transmission within the network. Accordingly, network switches may be used to facilitate the connection and communication between multiple nodes within a network. Bandwidth is an important factor in network switching performance, as sustained high bandwidth results in faster communication between nodes. Latency is another important factor in network switching performance.

BRIEF DESCRIPTION OF THE DRAWINGS

Aspects of the present disclosure are best understood from the following detailed description when read with the accompanying figures.

Corresponding numerals and symbols in the different figures generally refer to corresponding parts unless otherwise indicated. The figures are drawn to clearly illustrate the relevant aspects of the disclosure and are not necessarily drawn to scale.

DETAILED DESCRIPTION

Figure 1:
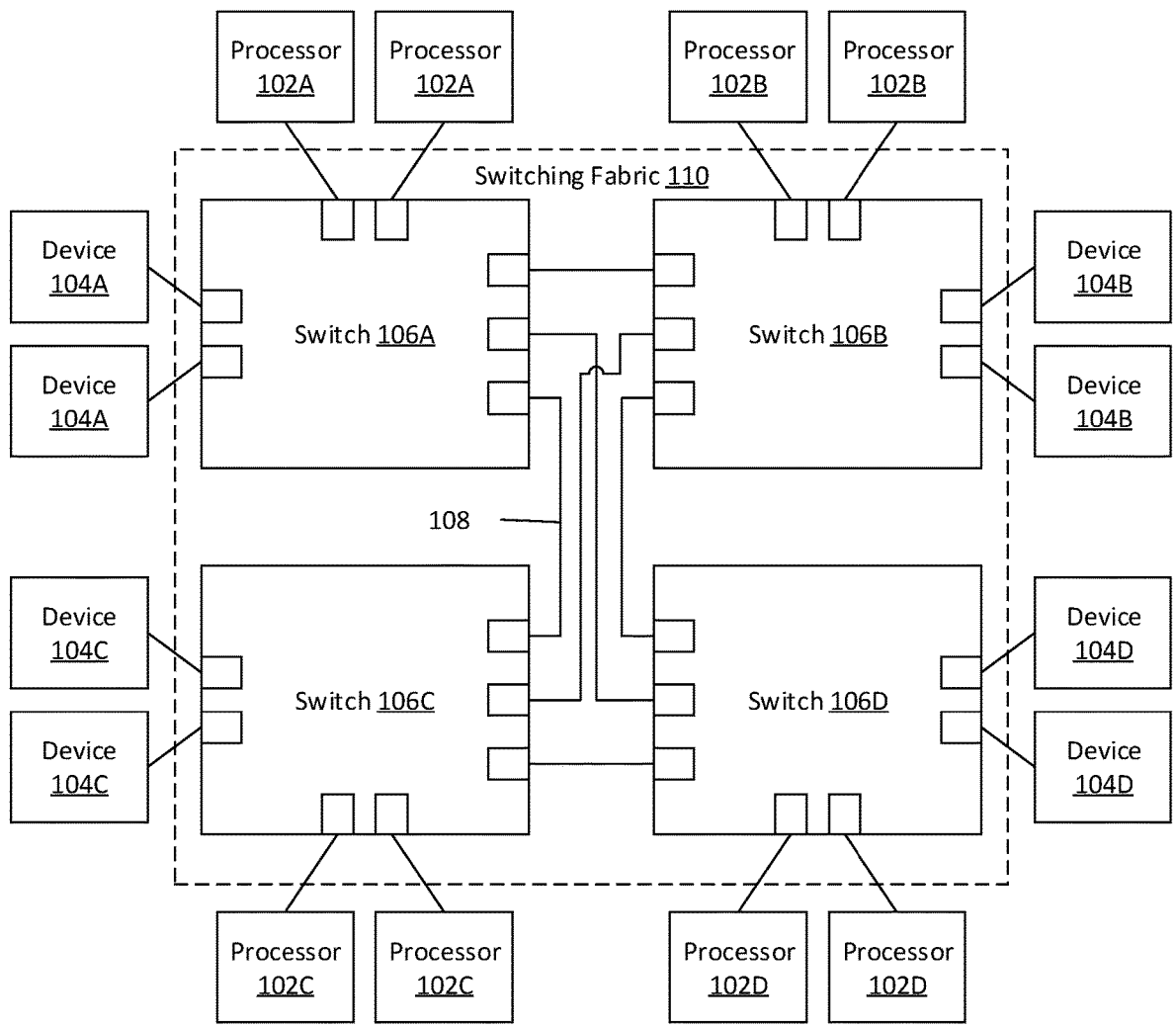
FIG. 1 is a diagram of a network system, according to some implementations.

The following disclosure provides many different examples for implementing different features. Specific examples of components and arrangements are described below to simplify the present disclosure. These are, of course, merely examples and are not intended to be limiting.

A switching fabric is used for data packet forwarding in a computing system. The switching fabric includes multiple network switches as well as links between the network switches. Nodes may use the switching fabric to communicate. For example, a first node may be connected to a first network switch of the switching fabric, a second node may be connected to a second network switch of the switching fabric, and the first node may send a packet to the second node via the switching fabric. Specifically, the first node may send the packet to an ingress port of the first network switch (to which the first node is connected) and the packet may be forwarded via the switching fabric to an egress port of the second network switch (to which the second node is connected).

A switching fabric has multiple routes that may be used to forward a packet from a source node to a destination node. The routes may be minimal routes or non-minimal routes. A minimal route has the lowest number of hops (or link crossings) from the source node to the destination node. A non-minimal route has more hops than a minimal route. Generally, a minimal route is the most efficient route for forwarding a packet from the source node to the destination node, as a minimal route may have lower latency than non-minimal routes (by nature of having fewer hops). However, opportunistic use of non-minimal routes may allow the performance of the switching fabric to be improved in cases where there are insufficient minimal routes available to carry the desired bandwidth, as higher bandwidths may be achieved by increasing the number of available routes that can be used. Both minimal routes and non-minimal routes may be used in tandem to forward packets from the source node to the destination node. This increased parallelism allows the bandwidth from the source node to the destination node to be increased, by taking advantage of non-minimal routes over links that would otherwise be idle or lightly used. However, overuse of non-minimal links between some nodes may increase the congestion on links shared by minimal routes between other nodes, which may decrease the overall performance of the network. Ideally, non-minimal routes should make opportunistic use of link bandwidth that would otherwise go unused in its absence, and traffic should use minimal routes otherwise to avoid creating congestion on shared links.

The present disclosure describes a switching fabric that uses traffic congestion information to inform its opportunistic use of non-minimal routes. An ingress port of a network switch collects traffic congestion information from the egress ports of the network switch. The traffic congestion information includes minimal and non-minimal route congestion metrics for the egress ports. For example, the minimal route congestion metric for an egress port may indicate the quantity of packets queued at the egress port for forwarding via the minimal routes using that egress port, while the non-minimal route congestion metric for the egress port may indicate the quantity of packets queued at the egress port for forwarding via the non-minimal routes using that egress port. Other congestion metrics may be utilized.

When forwarding a packet received from a source node, the ingress port identifies a subset of the egress ports that are candidates for forwarding the packet towards a destination node via routes of the network. The candidate egress ports may provide minimal routes from the source node to the destination node, or may provide non-minimal routes from the source node to the destination node. The network switch then selects a target egress port from among the candidate egress ports based on their traffic congestion information.

The selection process is biased to prefer some candidate egress ports over others. Specifically, if a candidate egress port provides a non-minimal route from the source node to the destination node, then that candidate egress port is disfavored by the selection process when the traffic congestion information indicates that candidate egress port has an excessive congestion of minimal route traffic. Thus, excessive congestion of minimal route traffic at an egress port mitigates against that egress port being selected by the ingress port for non-minimal route traffic. In this way, non-minimal routes may be opportunistically used when needed to increase bandwidth between nodes when the non-minimal route links would be otherwise lightly loaded or idle, but that opportunistic use may avoid adding congestion to links serving minimal routes between other nodes. Thus, network bandwidth may be increased without excessively increasing network latency and/or power consumption.

FIG. 1 is a diagram of a network system 100, according to some implementations. The network system 100 may be a high performance network that is part of a computing system, a high-performance computing (HPC) environment, or the like. In the network system 100, processors 102 (e.g., processors 102A-102D) and devices 104 (e.g., devices 104A-104D) communicate with one another via network switches 106 (e.g., network switches 106A-106D).

The processors 102 retrieve executable code from memory (not separately illustrated) and execute the executable code. The executable code may, when executed by a processor 102, cause the processor 102 to implement any desired functionality. A processor 102 may be a microprocessor, an application-specific integrated circuit, a microcontroller, or the like.

The devices 104 include various other hardware elements, external and internal to the network system 100. For example, the devices 104 may include accelerators, network interface devices, memory expansion devices, and the like. The devices 104 may (or may not) have local memory that is accessible to the processors 102. Additionally, the devices 104 may access system memory (not separately illustrated). The devices 104 may communicate with the processors 102, or with one another, via the network switches 106.

The network switches 106 interconnect the processors 102 and the devices 104. The network switches 106 are connected to one another via network links 108 to form a switching fabric 110. The switching fabric 110 may have any suitable topology. In some implementations, the switching fabric 110 has a mesh topology.

The network switches 106 include ports, to which the processors 102, the devices 104, and others of the network switches 106 are connected. The processors 102 and the devices 104 communicate with each other via packets that are transferred between ingress ports and egress ports of the network switches 106 in the switching fabric 110. Generally, the switching fabric 110 may be used for communication between nodes (e.g., the processors 102 and the devices 104). The processors 102 and the devices 104 are only examples of components that may be interconnected via the switching fabric 110. Other components may be connected to the switching fabric 110. The packets may be routed through the switching fabric 110. In some implementations, the switching fabric 110 is a Compute Express Link (CXL) fabric; the devices 104 are Type 1, 2, or 3 CXL devices; and the network links 108 are PCI Express interfaces.

Figure 2:
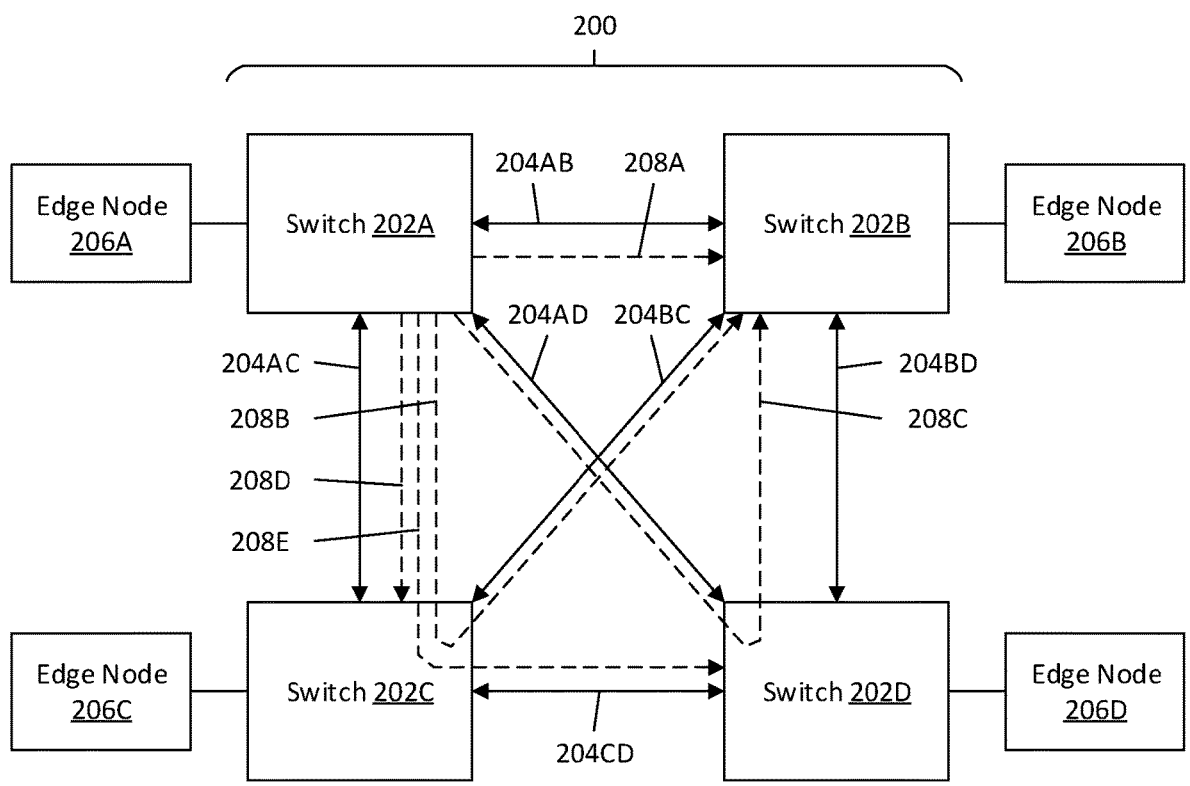
FIG. 2 is a diagram of a switching fabric, according to some implementations.

FIG. 2 is a diagram of a switching fabric 200, according to some implementations. The switching fabric 200 is an example of the switching fabric 110 previously described for FIG. 1. The switching fabric 200 includes network switches 202 (e.g., network switches 202A-202D) as well as network links 204 (e.g., network links 204AB-204CD). The network links 204 interconnect the network switches 202 to form a network having a desired topology. The switching fabric 200 may be used by nodes 206 (e.g., nodes 206A-206D) to communicate with one another. The nodes 206 may correspond to the processors 102 or the devices 104 of FIG. 1, or combinations of processors and devices.

The switching fabric 200 includes multiple routes 208 that may be used to forward a packet from a source node 206 to a destination node 206. Three example routes from the node 206A to the node 206B are shown: a route 208A that crosses the link 204AB; a route 208B that crosses the link 204AC and the link 204BC; and a route 208C that crosses the link 204AD and the link 204BD. Further, an example route 208D from the node 206A to the node 206C is shown (crossing the link 204AC). Finally, an example route 208E from the node 206A to the node 206D is shown (crossing the link 204AC and the link 204CD).

The routes 208 may be minimal routes or may be non-minimal routes. Continuing the previous example, the route 208A is a minimal route from the node 206A to the node 206B, as it has the lowest number of hops (or link crossings) from the node 206A to the node 206B. The route 208B and the route 208C are non-minimal routes from the node 206A to the node 206B, as they have more hops than the route 208A. Specifically, the route 208B has an additional hop (across the switch 202C) as compared to the route 208A, while the route 208C also has an additional hop (across the switch 202D) as compared to the route 208A. Further, the route 208D is a minimal route from the node 206A to the node 206C. Finally, the route 208E is a non-minimal route from the node 206A to the node 206D.

Generally, a minimal route is the most efficient route for forwarding a packet from a source node 206 to a destination node 206, however, opportunistic use of non-minimal routes may allow the performance of the switching fabric to be improved. For example, while the route 208A (a minimal route from the node 206A to the node 206B) may be more efficient than the routes 208B, 208C (non-minimal routes from the node 206A to the node 206B), opportunistic use of all the routes 208A, 208B, 208C may allow for an increase in bandwidth from the node 206A to the node 206B.

Overuse of non-minimal routes between some nodes may cause congestion of minimal routes between other nodes, thereby increasing network latency and/or power consumption. For example, overuse of the route 208B (from the node 206A to the node 206B) may cause congestion of the route 208D (from the node 206A to the node 206C). As subsequently described in greater detail, traffic congestion information will be used by a network switch 202 to inform the opportunistic use of non-minimal routes, so that the forwarding of traffic on non-minimal routes in the switching fabric 200 does not degrade the forwarding of traffic on minimal routes in the switching fabric 200. In this example where the routes 208B, 208D, 208E each cross a same network link, opportunistic use of the route 208B (a non-minimal route) will be avoided in favor of other traffic using the route 208D (a minimal route). However, opportunistic use of the route 208B will not be avoided in favor of other traffic using the route 208E (another non-minimal route).

Figure 3:
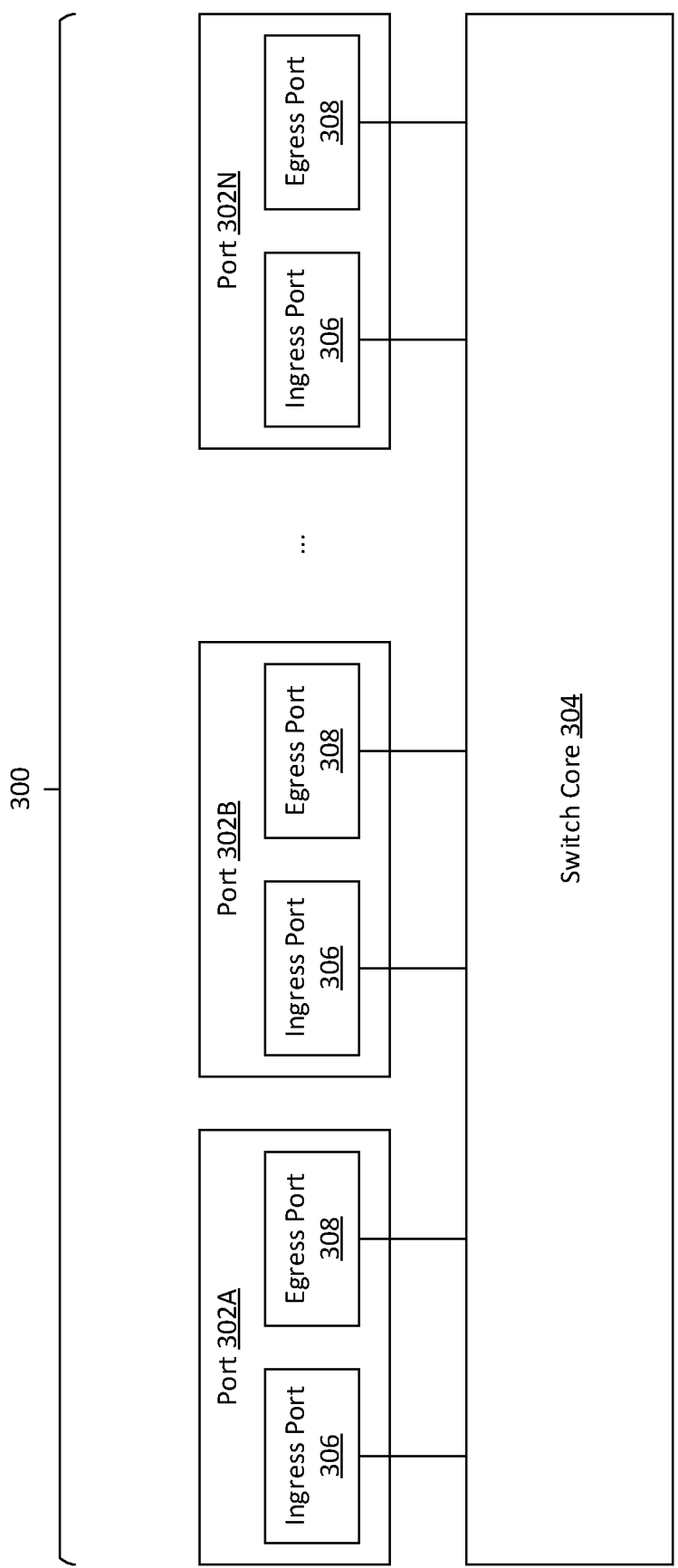
FIG. 3 is a block diagram of a network switch, according to some implementations.

FIG. 3 is a block diagram of a network switch 300, according to some implementations. The network switch 300 is an example of the network switches previously described for FIGS. 1-2. The network switch 300 includes ports 302 (e.g., ports 302A, 302B, and 302N) and a switch core 304. The ports 302 serve as connection points for nodes (e.g., processors, devices, etc.). The switch core 304 manages and forwards data packets between the ports 302.

Each port 302 includes an ingress port 306 and an egress port 308. The ingress ports 306 are the input points through which packets enter the network switch 300. The egress ports 308 are the output points responsible for transmitting the packets towards their designated destinations. When a packet arrives at an ingress port 306, the network switch 300 examines the packet's destination address to determine the appropriate egress port 308 for transmission. This process, known as switching or forwarding, includes performing a lookup in a routing table of the network switch 300 to find the candidate forwarding path(s) for the packet. The candidate forwarding paths may include a list of egress ports for minimal routes, and a list of egress ports for non-minimal routes. An ingress port 306 controls how packets are sent to the egress ports 308.

The ports 302 (including the ingress ports 306 and the egress ports 308) are interconnected via the switch core 304, which provides the necessary pathways for packets to move from the ingress ports 306 to the egress ports 308. The switch core 304 links the ingress ports 306 and the egress ports 308. Depending on the architecture of the network switch 300, the switch core 304 may be implemented using for example a single crossbar, a crossbar matrix, shared buses, shared memory, a chip-wide ring, or the like. In an implementation, the switch core 304 includes multiple crossbars which are used for both control and data transmission between the ingress ports 306 and the egress ports 308.

The components of the network switch 300 can be implemented as integrated circuits, such as in one or more integrated circuit die(s) and/or one or more integrated circuit package(s). For example, the network switch 300 may include a processor, an application-specific integrated circuit, a field-programmable gate array, memory, combinations thereof, or the like. One or more modules within the network switch 300 may be partially or wholly embodied as software and/or hardware for performing any functionality described herein. For example, the buffers, crossbars, transmitters, receivers, fabrics, etc. described herein may each be embodied as logic blocks of an integrated circuit.

Figure 4:
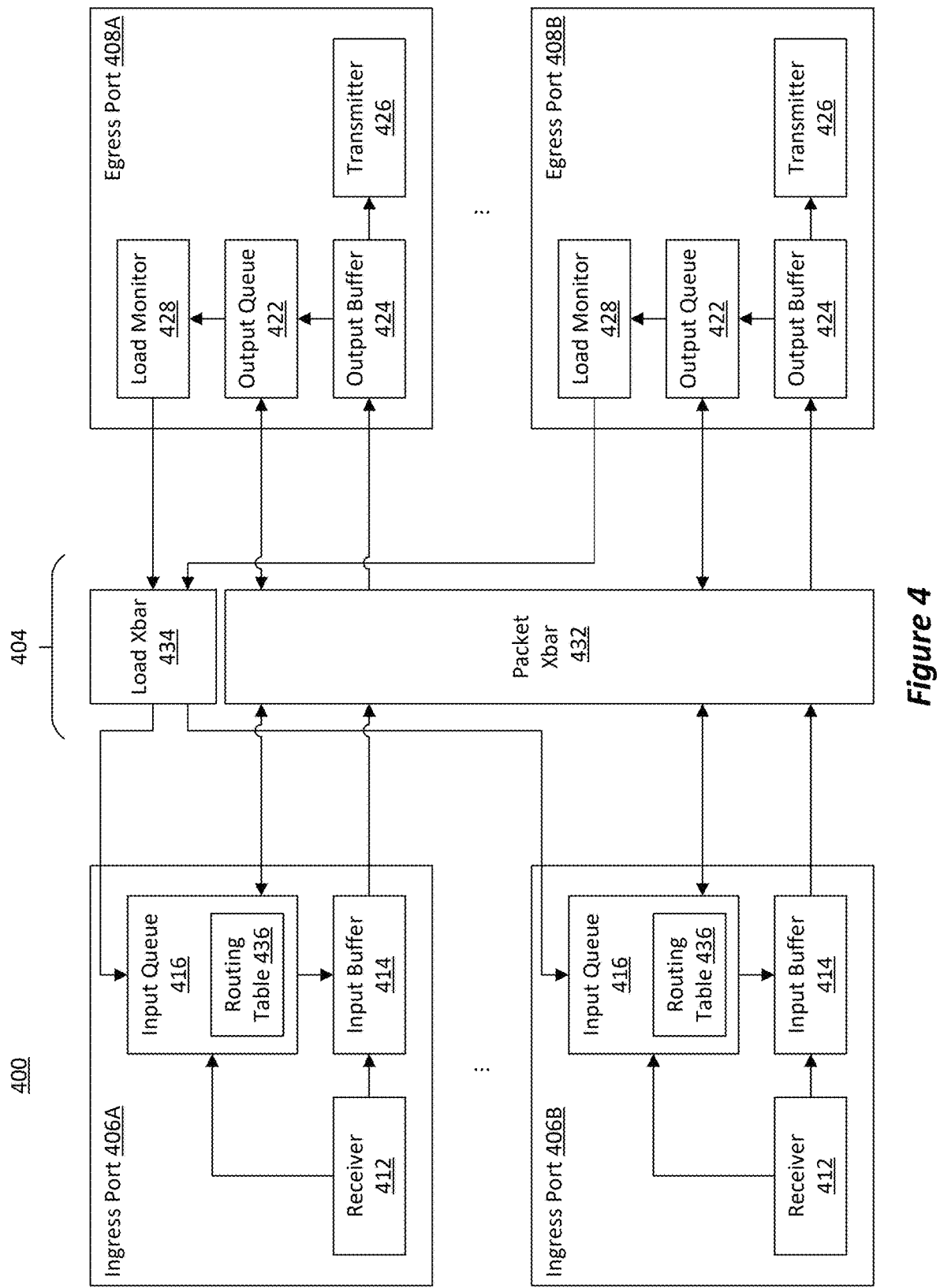
FIG. 4 is a block diagram of a network switch, according to some implementations.

FIG. 4 is a block diagram of a network switch 400, according to some implementations. The network switch 400 is an example of the network switches previously described for FIGS. 1-3. Additional components of the network switch 400 (including components of a switch core 404, a plurality of ingress ports 406 (including ingress ports 406A and 406B), and a plurality of egress ports 408 (including egress ports 408A and 408B)) are illustrated. A logical flow during the forwarding of packets from the ingress ports 406 to the egress ports 408 is shown.

First, components of the network switch 400 will be described. Each ingress port 406 includes a receiver 412, an input buffer 414, and an input queue 416. The receiver 412 receives packets on a physical link from a source node that is connected via the ingress port 406. The packets are destined for a destination node that is connected via one or more of the egress ports 408. The source node and/or the destination node may be directly connected to the network switch 400, or there may be one or more network components (e.g., additional switches) between the network switch 400 and the source/destination node(s). The input buffer 414 is connected to the receiver 412. The received packets are stored in the input buffer 414. The input queue 416 is connected to the input buffer 414 and the receiver 412. The input queue 416 is an input controller that controls transmitting of the packets from the input buffer 414 to output buffers of the egress ports 408. Requests to send packets to the egress ports 408 are queued at the input queue 416 by the receiver 412. The input queue 416 arbitrates among its queued requests and selects a request to process. The input queue 416 determines which egress port 408 a packet for a selected request should be forwarded to. For example, a lookup unit (not separately illustrated) may extract appropriate header(s) from the packet and use them to determine the destination node of the packet. The input queue 416 may receive the lookup result from the lookup unit.

Each egress port 408 includes an output queue 422, an output buffer 424, a transmitter 426, and a load monitor 428. The output queue 422 is an output controller that controls receiving of packets in the output buffer 424 from input buffers of the ingress ports 406. Requests to receive packets from the ingress ports 406 are queued at the output queue 422. The output queue 422 arbitrates among its queued requests and selects a request to process. The output buffer 424 is connected to the output queue 422. Received packets are stored in the output buffer 424. The transmitter 426 is connected to the output buffer 424. The transmitter 426 reads packets from the output buffer 424 and transmits the packets towards the destination nodes by sending signals down a physical link. Thus, by controlling the receiving of packets in the output buffer 424, the output queue 422 effectively controls reading of the packets from the output buffer 424 by the transmitter 426.

The switch core 404 is depicted with an example crossbar-based implementation, including multiple crossbars that are different from one another. In this example, the switch core 404 includes a packet crossbar 432 and a load crossbar 434. As previously noted, other types of switching cores could be utilized.

The packet crossbar 432 is connected to the input buffer 414 and the input queue 416 of each ingress port 406, and is connected to the output queue 422 and the output buffer 424 of each egress port 408. Transfer requests, transfer grants, and packets will be transferred over the packet crossbar 432. In some implementations, multiple packet crossbar(s) or other switch core architectures may be utilized. For example, transfer requests may be sent over a request crossbar, transfer grants may be sent over a grant crossbar, and packets may be transferred over a data crossbar.

The load crossbar 434 is connected to the input queue 416 of each ingress port 406, and is connected to the load monitor 428 of each egress port 408. As subsequently described in greater detail, traffic congestion information will be transferred over the load crossbar 434. The load crossbar 434 is a dedicated feedback fabric that is separate from the packet crossbar 432.

A logical flow for the forwarding of packets from an ingress port 406 to an egress port 408 will now be described. This logical flow is an example, and other methods of packet forwarding could be utilized. The receiver 412 of the ingress port 406 receives a packet and stores the packet in the input buffer 414 of the ingress port 406. A request to transfer the packet is queued at the input queue 416 of the ingress port 406, which then selects the request for processing. The input queue 416 sends a transfer request for the packet to the output queue 422 of the egress port 408 over the switch core 404 (e.g., the packet crossbar 432). The transfer request includes a description of the packet; for example, the request may include information from a header of the packet.

The transfer request is queued at the output queue 422 of the egress port 408, which then selects the transfer request for processing. The output queue 422 decides whether and when to grant the transfer request. For example, the output queue 422 may decide which transfer request to grant next based on the packet descriptions of the transfer requests, and based on the current state of the output buffer 424 of the egress port 408. In response to the transfer request being granted, the output queue 422 sends a transfer grant to the input queue 416 of the ingress port 406 over the switch core 404 (e.g., the packet crossbar 432).

The transfer grant is a notification that instructs the input queue 416 to move the packet from the input buffer 414 of the ingress port 406 to the output buffer 424 of the egress port 408. In response to receiving the transfer grant, the input queue 416 transfers the packet from the input buffer 414 to the output buffer 424 over the switch core 404 (e.g., the packet crossbar 432). The transmitter 426 of the egress port 408 then reads the packet from the output buffer 424. Thus, the output queue 422 controls the reading of the packet by the transmitter 426 (and thus determines which packets are sent via the transmitter 426) by the granting of the transfer request.

When a packet is received from a source node or from another switch at an ingress port 406, there may be multiple egress ports 408 that are candidates for forwarding the packet towards a destination node via a route of the network. Each of the candidate egress ports 408 may provide a minimal route or a non-minimal route to the destination node. That is, a first subset of the egress ports 408 may be candidates for forwarding the packet towards the destination node via minimal routes of the network, and a second subset of the egress ports 408 may be candidates for forwarding the packet towards the destination node via non-minimal routes of the network. Both minimal and non-minimal routes may be opportunistically used to increase the bandwidth from the source node to the destination node. For example, when multiple packets are being forwarded, they may be multiplexed across the minimal and non-minimal routes. When forwarding a packet towards a destination node, an ingress port 406 may identify multiple candidate egress ports 408, and then select one of the candidate egress port 408 for forwarding.

The ingress port 406 may identify the candidate egress ports 408 using a routing table 436. The routing table 436 may be stored at the input queue 416 for the ingress port 406. The routing table 436 includes a mapping of destination nodes to egress ports 408 that provide the routes to the destination nodes. When the ingress port 406 receives a packet, the input queue 416 may identify the destination node for the packet (e.g., using a destination node identifier in the header of the packet) and then look up that destination node in the routing table 436 to identify candidate egress ports 408 for reaching the destination node. The routing table 436 may indicate whether each candidate egress port 408 provides a minimal route or a non-minimal route to the destination node.

Once the candidate egress ports 408 are identified by the ingress port 406, the ingress port 406 selects one of the candidate egress port 408 based on traffic congestion information for the candidate egress ports 408. For example, the traffic congestion information may be stored at the input queue 416. The input queue 416 may arbitrate among the candidate egress port 408 based on the traffic congestion information to determine the selected egress port 408.

The traffic congestion information includes metrics for each of the egress ports 408. Transfer requests for packets to different destination nodes may be queued at an output queue 422 of an egress port 408. A packet queued for transfer at an egress port 408 may be on a minimal route to its destination node or may be on a non-minimal route to its destination node. The traffic congestion information includes minimal route congestion metrics for the egress ports 408 as well as non-minimal route congestion metrics for the egress ports 408.

The minimal route congestion metrics indicate, for each egress port 408, its level of congestion of minimal route traffic. As used here, minimal route traffic is the traffic, queued at an egress port 408 (including traffic from the ingress ports 406 and targeting all destinations), for which the egress port 408 provides a minimal route choice. In some implementations, the minimal route congestion metrics indicate traffic backlogs at the egress ports 408 for minimal routes of the network. For example, the minimal route congestion metrics indicate may indicate the quantities of packets queued at the output queues 422 of the egress ports 408 for forwarding via minimal routes. In some implementations, the minimal route congestion metrics indicate traffic latencies at the egress ports 408 for minimal routes of the network. Other suitable minimal route congestion metrics may be utilized.

The non-minimal route congestion metrics indicate, for each egress port 408, its level of congestion of non-minimal route traffic. As used here, non-minimal route traffic is the traffic, queued at an egress port 408 (including traffic from the ingress ports 406 and targeting all destinations), for which the egress port 408 provides a non-minimal route choice. In some implementations, the non-minimal route congestion metrics indicate traffic backlogs at the egress ports 408 for non-minimal routes of the network. For example, the non-minimal route congestion metrics indicate may indicate the quantities of packets queued at the output queues 422 of the egress ports 408 for forwarding via non-minimal routes. In some implementations, the non-minimal route congestion metrics indicate traffic latencies at the egress ports 408 for non-minimal routes of the network. Other suitable non-minimal route congestion metrics may be utilized.

As will be apparent from the previous description, an ingress port 406 tracks two separate metrics for each egress port 408: a minimal route congestion metric and a non-minimal route congestion metric. Thus, each ingress port 406 knows the level of congestion of minimal route traffic at each egress port 408. Additionally, each ingress port 406 knows the level of congestion of non-minimal route traffic at each egress port 408.

As previously noted, once an ingress port 406 identifies candidate egress ports 408 for forwarding a packet towards a destination node, it may select one of the egress ports 408 by arbitrating among the candidate egress ports 408 based on the traffic congestion information. The arbitration process is weighted to prefer some candidate egress ports 408 over others. Specifically, if a candidate egress port 408 provides a non-minimal route from the source node to the destination node, then that candidate egress port 408 is disfavored by the arbitration process when the traffic congestion information indicates that candidate egress port 408 has an excessive level of congestion of minimal route traffic. In this way, egress ports 408 that are good candidates for opportunistic non-minimal routing may be preferred over other egress ports 408, which are poor candidates because their use will negatively impact minimal traffic sharing the same egress ports 408.

The arbitration process may include calculating, for each respective candidate egress port 408, a weighted sum of the traffic congestion information (e.g., the minimal and non-minimal route congestion metrics) for the respective candidate egress port 408. For a non-minimal candidate egress port 408, the minimal route congestion metric may be more heavily weighted than the non-minimal route congestion metric. Thus, a non-minimal candidate egress port 408 that is congested by minimal traffic on behalf of other routes is less likely to be selected than a non-minimal candidate egress port 408 that is similarly congested by non-minimal traffic on behalf of other routes. Likewise, when calculating the weighted sums, the minimal route congestion metric for a non-minimal candidate egress port 408 may be more heavily weighted than the minimal route congestion metric for a minimal candidate egress port 408. Thus, If the non-minimal candidate ports 408 are similarly congested by minimal traffic, the selection of a non-minimal candidate egress port 408 is less likely than the selection of a minimal candidate egress port 408.

The traffic congestion information is collected at each egress port 408 and sent to each of the ingress ports 406. A load monitor 428 at an egress port 408 may collect traffic congestion information for the egress port 408, and send that traffic congestion information to the input queues 416 of the ingress ports 406. The traffic congestion information may be sent over the switch core 404 (e.g., the load crossbar 434). The input queues 416 track the traffic congestion information for the egress ports 408. The traffic congestion information may be used, by an ingress port 406, to inform its opportunistic use of non-minimal routes (as previously described).

Figure 5:
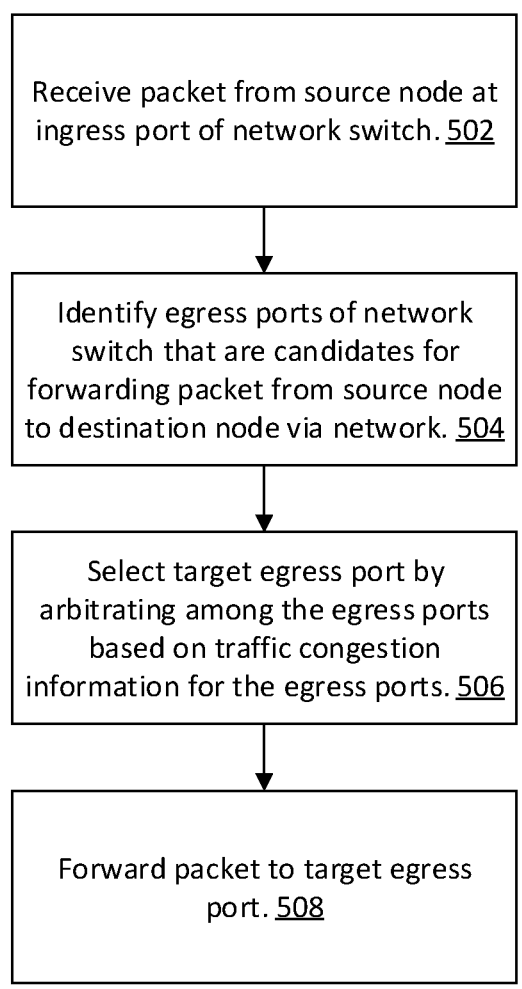
FIG. 5 is a diagram of a packet forwarding method, according to some implementations.

FIG. 5 is a diagram of a packet forwarding method 500, according to some implementations. The packet forwarding method 500 will be described in conjunction with FIG. 4. The packet forwarding method 500 may be performed by the network switch 400 during the forwarding of a packet from an ingress port 406 to an egress port 408.

The network switch 400 performs a step 502 of receiving a packet from a source node at an ingress port of a first network switch, the packet destined for a destination node connected to a second network switch, the first network switch and the second network switch being within a network. For example, a packet may be received at an ingress port 406 of the network switch 400. The source node and the destination node are also within the network. The network may have any desired topology, such as a mesh topology, a tree topology, or the like.

The network switch 400 performs a step 504 of identifying egress ports of the first network switch that are candidates for forwarding the packet towards the destination node via the network. For example, the ingress port 406 may look up, in the routing table 436, the egress ports 408 to which the packet may be forwarded for routing towards the destination node. The candidate egress ports 408 may provide minimal routes or non-minimal routes to the destination node. A first subset of the egress ports 408 may be candidates for forwarding the packet towards the destination node via minimal routes of the network, and a second subset of the egress ports 408 may be candidates for forwarding the packet towards the destination node via non-minimal routes of the network.

The network switch 400 performs a step 506 of selecting a target egress port by arbitrating among the egress ports based on traffic congestion information for the egress ports, the traffic congestion information including minimal route congestion metrics for the egress ports, the traffic congestion information further including non-minimal route congestion metrics for the egress ports. For example, the target egress port 408 may be selected by the ingress port 406 based on the minimal route congestion metrics and the non-minimal route congestion metrics.

In some implementations, the minimal route congestion metrics of the traffic congestion information indicate traffic backlogs at the egress ports 408 for minimal routes of the network, and the non-minimal route congestion metrics indicate traffic backlogs at the egress ports 408 for non-minimal routes of the network. In some implementations, the minimal route congestion metrics of the traffic congestion information indicate traffic latencies at the egress ports 408 for minimal routes of the network, and the non-minimal route congestion metrics indicate traffic latencies at the egress ports 408 for non-minimal routes of the network.

Arbitrating among the egress ports 408 may include disfavoring ones of the second subset of the egress ports 408 (providing non-minimal routes to the destination node) that have high minimal route congestion metrics. For example, the ones of the second subset of the egress ports 408 with a large traffic backlog or a large traffic latency on minimal routes may be disfavored.

In an implementation, a combined metric for a candidate egress port 408 may be calculated by computing a sum-of-products: a minimal weight multiplied by the minimal route congestion metric for the candidate egress port 408 may be summed with a non-minimal weight multiplied by the non-minimal route congestion metric for the candidate egress port 408. Selection of an egress port 408 could then be made statistically or deterministically, favoring the egress ports 408 with lower values of this combined metric over the egress ports 408 with higher values of this combined metric.

The candidate egress ports 408 may be assigned weights for the arbitration process based on whether they provide minimal or non-minimal routes to the destination node, and disfavoring the egress ports 408 may include increasing their weights. A first minimal weight and a first non-minimal weight may be used to calculated the combined metric for a candidate egress port 408 when the candidate egress port 408 provides a minimal route to the destination node. A second minimal weight and a second non-minimal weight may be used to calculated the combined metric for the candidate egress port 408 when the candidate egress port 408 provides a non-minimal route to the destination node. The second minimal weight is greater than the first minimal weight. In other words, when calculating the combined metrics for the egress ports 408, a weight of the minimal route congestion metrics for the second subset of the egress ports 408 is greater than a weight of the minimal route congestion metrics for the first subset of the egress ports 408. As a result, the minimal route congestion metrics for the second subset of the egress ports 408 are more heavily weighted than the minimal route congestion metrics for the first subset of the egress ports 408. Likewise, the minimal route congestion metrics for the second subset of the egress ports 408 may be more heavily weighted than the non-minimal route congestion metrics for the second subset of the egress ports 408. Further, the second non-minimal weight may (or may not) be different than the first non-minimal weight.

Traffic congestion information may be stored at the input queue 416 of the ingress port 406. The traffic congestion information may have been previously received from the load monitors 428 of the egress ports 408. For example, the traffic congestion information may have been collected at the egress ports 408, and then sent to the ingress ports 406. The traffic congestion information may be sent from the egress ports 408 to the ingress port 406 via a feedback fabric, such as the load crossbar 434.

In some implementations, the candidate egress ports 408 may also be identified (in step 504) based, at least in part, on the traffic congestion information. Specifically, if the minimal route congestion metric of an egress port 408 is too large, then that egress port 408 may not be treated as a candidate egress port 408. In some implementations, the candidate egress ports 408 are those whose minimal route congestion metrics are less than a predetermined threshold.

The network switch 400 performs a step 508 of forwarding the packet to the target egress port. For example, the input queue 416 of the ingress port 406 may send a packet transfer request to the output queue 422 of the target egress port 408. Upon receiving a corresponding transfer grant from the target egress port 408, the ingress port 406 transfers the packet from its input buffer 414 to the output buffer 424 of the target egress port 408.

Figure 6:
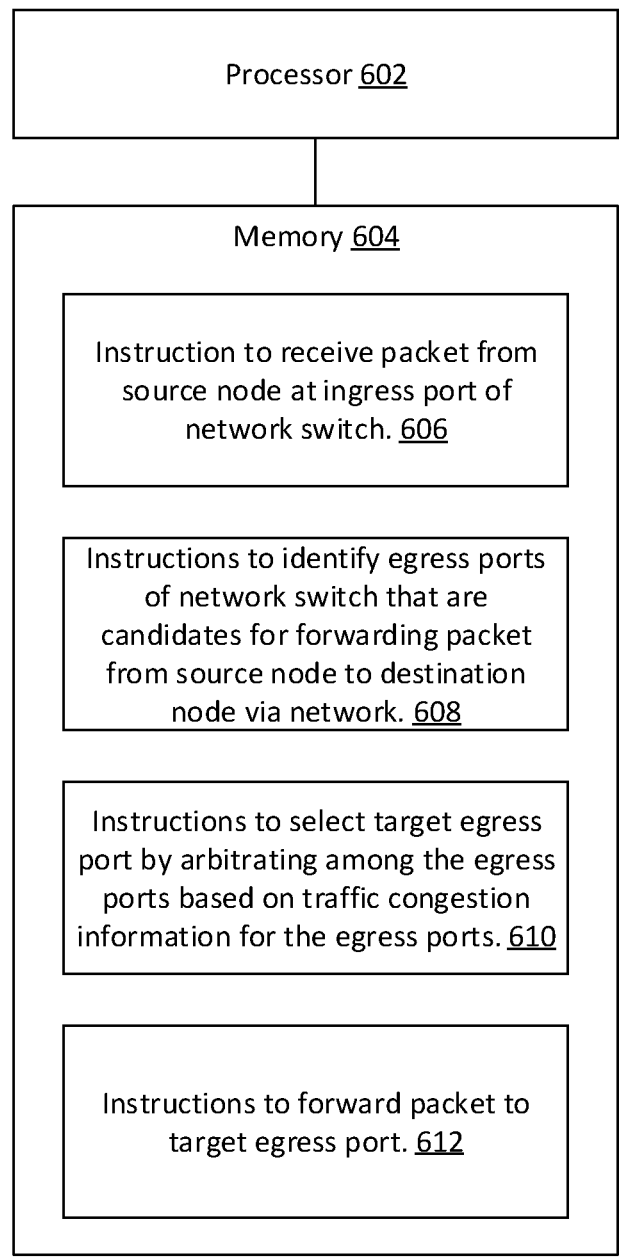
FIG. 6 is a block diagram of a network switch, according to some implementations.

FIG. 6 is a block diagram of a network switch 600, according to some implementations. The network switch 600 is an example of the network switch 400 previously described for FIG. 4. The network switch 600 may include a processor 602 and a memory 604. The memory 604 may be a non-transitory computer readable medium that stores programming for execution by the processor. In this implementation, one or more modules within the network switch 600 may be partially or wholly embodied as software for performing any functionality described herein. For example, the memory 604 may include: instructions 606 for receiving a packet from a source node at an ingress port of a first network switch, the packet destined for a destination node connected to a second network switch, the first network switch and the second network switch being within a network; instructions 608 for identifying egress ports of the first network switch that are candidates for forwarding the packet towards the destination node via the network; instructions 610 for selecting a target egress port by arbitrating among the egress ports based on traffic congestion information for the egress ports, the traffic congestion information including minimal route congestion metrics for the egress ports, the traffic congestion information further including non-minimal route congestion metrics for the egress ports; and/or instructions 612 for forwarding the packet to the target egress port.

Some variations are contemplated. For example, the switching techniques described herein may be applicable to other types of switching fabrics, such as Ethernet fabrics.

In an example implementation, a method includes: receiving a packet from a source node at an ingress port of a first network switch, the packet destined for a destination node connected to a second network switch, the first network switch and the second network switch being within a network; identifying egress ports of the first network switch that are candidates for forwarding the packet towards the destination node via the network; selecting a target egress port by arbitrating among the egress ports based on traffic congestion information for the egress ports, the traffic congestion information including minimal route congestion metrics for the egress ports, the traffic congestion information further including non-minimal route congestion metrics for the egress ports; and forwarding the packet to the target egress port. In some implementations of the method, a first subset of the egress ports are candidates for forwarding the packet towards the destination node via minimal routes of the network, and a second subset of the egress ports are candidates for forwarding the packet towards the destination node via non-minimal routes of the network. In some implementations of the method, arbitrating among the egress ports includes: calculating weighted sums of the minimal route congestion metrics and the non-minimal route congestion metrics for the egress ports, the minimal route congestion metrics for the second subset of the egress ports being more heavily weighted than the non-minimal route congestion metrics for the second subset of the egress ports. In some implementations of the method, the minimal route congestion metrics indicate traffic backlogs at the egress ports for minimal routes of the network, and the non-minimal route congestion metrics indicate traffic backlogs at the egress ports for non-minimal routes of the network. In some implementations of the method, the minimal route congestion metrics indicate traffic latencies at the egress ports for minimal routes of the network, and the non-minimal route congestion metrics indicate traffic latencies at the egress ports for non-minimal routes of the network. In some implementations of the method, the network has a mesh topology. In some implementations, the method further includes: collecting the traffic congestion information at the egress ports; and sending the traffic congestion information to the ingress port. In some implementations of the method, the traffic congestion information is sent from the egress ports to the ingress port via a feedback fabric of the first network switch.

In an example implementation, a network switch includes: a plurality of egress ports; and an ingress port configured to: receive a packet from a source node, the packet destined for a destination node, the source node and the destination node being within a network; identify candidate egress ports of the plurality of egress ports that are candidates for forwarding the packet towards the destination node via the network; select a target egress port by arbitrating among the candidate egress ports based on traffic congestion information for the plurality of egress ports, the traffic congestion information including minimal route congestion metrics for the plurality of egress ports, the traffic congestion information further including non-minimal route congestion metrics for the plurality of egress ports; and forward the packet to the target egress port. In some implementations of the network switch, a first subset of the candidate egress ports are candidates for forwarding the packet towards the destination node via minimal routes of the network, and a second subset of the candidate egress ports are candidates for forwarding the packet towards the destination node via non-minimal routes of the network. In some implementations of the network switch, the non-minimal routes of the network have more hops than the minimal routes of the network. In some implementations of the network switch, arbitrating among the candidate egress ports includes: calculating weighted sums of the minimal route congestion metrics and the non-minimal route congestion metrics for the egress ports, a weight of the minimal route congestion metrics for the second subset of the candidate egress ports being greater than a weight of the minimal route congestion metrics for the first subset of the candidate egress ports. In some implementations of the network switch, the minimal route congestion metrics indicate traffic backlogs at the candidate egress ports for minimal routes of the network, and the non-minimal route congestion metrics indicate traffic backlogs at the candidate egress ports for non-minimal routes of the network. In some implementations of the network switch, the minimal route congestion metrics indicate traffic latencies at the candidate egress ports for minimal routes of the network, and the non-minimal route congestion metrics indicate traffic latencies at the candidate egress ports for non-minimal routes of the network. In some implementations, the network switch further includes a feedback fabric, where each of the egress ports is configured to: collect the traffic congestion information; and send the traffic congestion information to the ingress port via the feedback fabric.

In an example implementation, a system includes: a first node; a first network switch connected to the first node; a second node; and a second network switch connected to the second node, the first network switch and the second network switch being within a network, the second network switch configured to: receive a packet from the second node at an ingress port of the second network switch; identify egress ports of the second network switch that are candidates for forwarding the packet from the second node to the first node via the network; receive traffic congestion information from the egress ports, the traffic congestion information including minimal route congestion metrics for the egress ports, the traffic congestion information further including non-minimal route congestion metrics for the egress ports; select a target egress port by arbitrating among the egress ports based on the traffic congestion information for the egress ports; and forward the packet to the target egress port. In some implementations of the system, the network has a mesh topology. In some implementations of the system, the second network switch includes a feedback fabric, and the traffic congestion information is received at the ingress port from the egress ports via the feedback fabric. In some implementations of the system, arbitrating among the egress ports includes: assigning weights for an arbitration process to the egress ports based on whether the egress ports provide minimal routes or non-minimal routes to the first node. In some implementations of the system, a first weight for the minimal route congestion metrics is assigned to the egress ports that provide minimal routes to the first node, a second weight for the minimal route congestion metrics is assigned to the egress ports that provide non-minimal routes to the first node, and the second weight is greater than the first weight.

The foregoing outlines features of several examples so that those skilled in the art may better understand the aspects of the present disclosure. Various modifications and combinations of the illustrative examples, as well as other examples, will be apparent to persons skilled in the art upon reference to the description. It is therefore intended that the appended claims encompass any such modifications.

What is claimed is:

1. A method comprising:
    receiving a packet from a source node at an ingress port of a first network switch, the packet destined for a destination node connected to a second network switch, the first network switch and the second network switch being within a network;
    identifying egress ports of the first network switch that are candidates for forwarding the packet towards the destination node via the network, the egress ports comprising non-minimal candidate egress ports, the non-minimal candidate egress ports being candidates for forwarding the packet towards the destination node via non-minimal routes of the network;
    obtaining traffic congestion information for the egress ports, the traffic congestion information comprising minimal route congestion metrics for the non-minimal candidate egress ports, the traffic congestion information further comprising non-minimal route congestion metrics for the non-minimal candidate egress ports, the minimal route congestion metrics representing congestion of minimal routes of the network for queued packets at the non-minimal candidate egress ports, the non-minimal route congestion metrics representing congestion of non-minimal routes of the network for the queued packets at the non-minimal candidate egress ports;
    selecting a target egress port of the non-minimal candidate egress ports by favoring the non-minimal candidate egress ports with lower values of the minimal route congestion metrics over the non-minimal candidate egress ports with higher values of the minimal route congestion metrics, wherein the target egress port is one of the favored non-minimal candidate egress ports; and
    forwarding the packet to the target egress port.

2. The method of claim 1, wherein the egress ports further comprise minimal candidate egress ports, the minimal candidate egress ports being candidates for forwarding the packet towards the destination node via minimal routes of the network.

3. The method of claim 2, wherein favoring the non-minimal candidate egress ports with lower values of the minimal route congestion metrics comprises:
    calculating weighted sums of the minimal route congestion metrics and the non-minimal route congestion metrics for the egress ports, the minimal route congestion metrics for the non-minimal candidate egress ports being more heavily weighted than the non-minimal route congestion metrics for the non-minimal candidate egress ports.

4. The method of claim 1, wherein the minimal route congestion metrics indicate traffic backlogs at the egress ports for minimal routes of the network, and the non-minimal route congestion metrics indicate traffic backlogs at the egress ports for non-minimal routes of the network.

5. The method of claim 1, wherein the minimal route congestion metrics indicate traffic latencies at the egress ports for minimal routes of the network, and the non-minimal route congestion metrics indicate traffic latencies at the egress ports for non-minimal routes of the network.

6. The method of claim 1, wherein the network has a mesh topology.

7. The method of claim 1, further comprising:
    collecting the traffic congestion information at the egress ports; and
    sending the traffic congestion information to the ingress port.

8. The method of claim 7, wherein the traffic congestion information is sent from the egress ports to the ingress port via a feedback fabric of the first network switch, the packet is forwarded to the target egress port via a data fabric of the first network switch, the feedback fabric being separate from the data fabric.

9. A network switch comprising:
    a plurality of egress ports; and
    an ingress port configured to:
        receive a packet from a source node, the packet destined for a destination node, the source node and the destination node being within a network;
        identify candidate egress ports of the plurality of egress ports that are candidates for forwarding the packet towards the destination node via the network, the candidate egress ports comprising non-minimal candidate egress ports, the non-minimal candidate egress ports being candidates for forwarding the packet towards the destination node via non-minimal routes of the network;
        obtain traffic congestion information for the candidate egress ports, the traffic congestion information comprising minimal route congestion metrics for the non-minimal candidate egress ports, the traffic congestion information further comprising non-minimal route congestion metrics for the non-minimal candidate egress ports, the minimal route congestion metrics representing congestion of minimal routes of the network for queued packets at the non-minimal candidate egress ports, the non-minimal route congestion metrics representing congestion of non-minimal routes of the network for the queued packets at the non-minimal candidate egress ports;

select a target egress port of the non-minimal candidate egress ports by favoring the non-minimal candidate egress ports with lower values of the minimal route congestion metrics over the non-minimal candidate egress ports with higher values of the minimal route congestion metrics, wherein the target egress port is one of the favored non-minimal candidate egress ports; and forward the packet to the target egress port.

10. The network switch of claim 9, wherein the candidate egress ports further comprise minimal candidate egress ports, the minimal candidate egress ports being candidates for forwarding the packet towards the destination node via minimal routes of the network.

11. The network switch of claim 10, wherein the non-minimal routes of the network have more hops than the minimal routes of the network.

12. The network switch of claim 10, wherein favoring the non-minimal candidate egress ports with lower values of the minimal route congestion metrics comprises:

calculating weighted sums of the minimal route congestion metrics and the non-minimal route congestion metrics for the candidate egress ports, a weight of the minimal route congestion metrics for the non-minimal candidate egress ports being greater than a weight of the non-minimal route congestion metrics for the non-minimal candidate egress ports.

13. The network switch of claim 9, wherein the minimal route congestion metrics indicate traffic backlogs at the candidate egress ports for minimal routes of the network, and the non-minimal route congestion metrics indicate traffic backlogs at the candidate egress ports for non-minimal routes of the network.

14. The network switch of claim 9, wherein the minimal route congestion metrics indicate traffic latencies at the candidate egress ports for minimal routes of the network, and the non-minimal route congestion metrics indicate traffic latencies at the candidate egress ports for non-minimal routes of the network.

15. The network switch of claim 9, further comprising a feedback fabric, wherein each of the candidate egress ports is configured to:

collect the traffic congestion information; and
send the traffic congestion information to the ingress port via the feedback fabric.

16. A system comprising:
a first node;
a first network switch connected to the first node;
a second node; and
a second network switch connected to the second node, the first network switch and the second network switch being within a network, the second network switch configured to:

receive a packet from the second node at an ingress port of the second network switch;

identify egress ports of the second network switch that are candidates for forwarding the packet from the second node to the first node via the network, the egress ports comprising non-minimal candidate egress ports, the non-minimal candidate egress ports being candidates for forwarding the packet towards the first node via non-minimal routes of the network;

receive traffic congestion information from the egress ports, the traffic congestion information comprising minimal route congestion metrics for the non-minimal candidate egress ports, the traffic congestion information further comprising non-minimal route congestion metrics for the non-minimal candidate egress ports, the minimal route congestion metrics representing congestion of minimal routes of the network for queued packets at the non-minimal candidate egress ports, the non-minimal route congestion metrics representing congestion of non-minimal routes of the network for the queued packets at the non-minimal candidate egress ports;

select a target egress port of the non-minimal candidate egress ports by favoring the non-minimal candidate egress ports with lower values of the minimal route congestion metrics over the non-minimal candidate egress ports with higher values of the minimal route congestion metrics, wherein the target egress port is one of the favored non-minimal candidate egress ports; and forward the packet to the target egress port.

17. The system of claim 16, wherein the network has a mesh topology.

18. The system of claim 16, wherein the second network switch comprises a feedback fabric, and the traffic congestion information is received at the ingress port from the egress ports via the feedback fabric.

19. The system of claim 16, wherein favoring the non-minimal candidate egress ports with lower values of the minimal route congestion metrics comprises:

assigning weights for an arbitration process to the egress ports based on whether the egress ports provide minimal routes or non-minimal routes to the first node.

20. The system of claim 19, wherein a first weight for the minimal route congestion metrics is assigned to the egress ports that provide minimal routes to the first node, a second weight for the minimal route congestion metrics is assigned to the egress ports that provide non-minimal routes to the first node, and the second weight is greater than the first weight.

* * * * *